United States Patent
Nagaratnam et al.

(10) Patent No.: US 11,689,375 B2
(45) Date of Patent: Jun. 27, 2023

(54) DATA IN TRANSIT PROTECTION WITH EXCLUSIVE CONTROL OF KEYS AND CERTIFICATES ACROSS HETEROGENEOUS DISTRIBUTED COMPUTING ENVIRONMENTS

(71) Applicant: International Business Machines Corporation, Armonk, NY (US)

(72) Inventors: Nataraj Nagaratnam, Cary, NC (US); Christopher S. Smith, Tamm (DE); David Nguyen, Wake Forest, NC (US); Martin Schmatz, Rueschlikon (CH); Marco Pavone, Ehningen (DE); Navaneeth Rameshan, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 17/303,165

(22) Filed: May 21, 2021

(65) Prior Publication Data
US 2022/0376929 A1 Nov. 24, 2022

(51) Int. Cl.
*H04L 9/32* (2006.01)
*H04L 9/08* (2006.01)
*H04L 9/14* (2006.01)

(52) U.S. Cl.
CPC .......... *H04L 9/3263* (2013.01); *H04L 9/0816* (2013.01); *H04L 9/14* (2013.01); *H04L 2209/56* (2013.01)

(58) Field of Classification Search
CPC ....... H04L 9/3263; H04L 9/0816; H04L 9/14; H04L 2209/56
See application file for complete search history.

(56) References Cited

U.S. PATENT DOCUMENTS 10,057,243 B1 * 8/2018 Kumar .................... H04L 9/321
10,706,182 B2 7/2020 Sion
(Continued)

FOREIGN PATENT DOCUMENTS

WO WO-2020160139 A1 * 8/2020 ......... H04L 63/0442

OTHER PUBLICATIONS

Acar, "Key Management In Distributed Systems," MSR-TR-2010-78, Jun. 2010, Published by Microsoft, Previously submitted to NDSS 2010, 14 pages.
(Continued)

*Primary Examiner* — Darshan I Dhruv
(74) *Attorney, Agent, or Firm* — Yee & Associates, P.C.

(57) ABSTRACT

Certificate and key management is provided. A signed certificate corresponding to an enterprise is deployed to a plurality of cryptographic communication protocol endpoint proxies located in a heterogeneous distributed computing environment where a private key corresponding to the enterprise is not placed in any of the plurality of cryptographic communication protocol endpoint proxies. Offload of cryptographic communications from the plurality of cryptographic communication protocol endpoint proxies to the hardware security module is received by the hardware security module where the hardware security module verifies connection authenticity for the plurality of cryptographic communication protocol endpoint proxies across the heterogeneous distributed computing environment using the private key corresponding to the enterprise that remains within a security boundary of the hardware security module.

22 Claims, 14 Drawing Sheets

(56) References Cited

U.S. PATENT DOCUMENTS

| | | | | |
|---|---|---|---|---|
| 2012/0096273 | A1* | 4/2012 | Campagna | H04L 9/3247 |
| | | | | 713/176 |
| 2015/0358294 | A1* | 12/2015 | Kancharla | H04L 63/06 |
| | | | | 713/164 |
| 2017/0111323 | A1* | 4/2017 | Borkar | H04L 9/321 |
| 2017/0351879 | A1* | 12/2017 | Sion | H04L 9/3226 |
| 2018/0062854 | A1* | 3/2018 | Kancharla | H04L 63/101 |
| 2018/0109377 | A1* | 4/2018 | Fu | H04L 63/0823 |
| 2018/0198620 | A1* | 7/2018 | Pearson | H04L 9/3247 |
| 2019/0166004 | A1* | 5/2019 | Sherman | H04L 67/12 |
| 2020/0153623 | A1* | 5/2020 | Asanghanwa | H04L 9/3213 |
| 2021/0152545 | A1* | 5/2021 | Park | H04L 9/3268 |
| 2021/0377049 | A1* | 12/2021 | Nix | H04L 9/0852 |
| 2022/0321528 | A1* | 10/2022 | Konda | H04L 63/0209 |

OTHER PUBLICATIONS

Anonymous, "Cloud Attachment Services," An IP.com Prior Art Database Technical Disclosure, IPCOM000219836D, Jul. 17, 2012, 8 pages.

Anonymous, "Method for automated monitoring instrumentation of application middleware within cloud computing infrastructure," An IP.com Prior Art Database Technical Disclosure, IPCOM000235859D, Mar. 27, 2014, 6 pages.

Anonymous, "Mechanism to support single certificate for different public keys in Cloud Deployments," An IP.com Prior Art Database Technical Disclosure, IPCOM000244693D, Jan. 6, 2016, 5 pages.

Mell et al., "The NIST Definition of Cloud Computing," Computer Security Division, National Institute of Standards and Technology, Jan. 2011, 7 pages.

* cited by examiner

US 11,689,375 B2

DATA IN TRANSIT PROTECTION WITH EXCLUSIVE CONTROL OF KEYS AND CERTIFICATES ACROSS HETEROGENEOUS DISTRIBUTED COMPUTING ENVIRONMENTS

BACKGROUND

1. Field

The disclosure relates generally to data security and more specifically to providing protection of secure data that is in transit via a network using exclusive control of cryptographic keys and certificates across heterogeneous distributed computing environments, such as multi-cloud environments comprised of a plurality of clouds corresponding to different cloud providers.

2. Description of the Related Art

Data security means protecting digital data from unauthorized access, corruption, or misappropriation throughout the entire lifecycle of the digital data. Data security typically involves preventing or at least reducing the probability of unauthorized or inappropriate access, although it may also involve reducing the adverse impacts of security incidents as well. A primary focus of data security is balance between confidentiality, integrity, and availability of data, while maintaining policy enforcement without hampering enterprise productivity. Confidentiality ensures that data is accessed only by authorized individuals. Integrity ensures that information is reliable as well as accurate. Availability ensures that data is both available and accessible to satisfy enterprise needs.

Data security is a top priority for enterprises as enterprises continue forward with their cloud journey. For example, enterprises want to have assurance regarding the security of their data before they move more workloads to a cloud environment. Addressing issues involving data security and compliance would provide a secure path in the next phase of their cloud journey. Currently, only about 20 percent of enterprise workloads have moved to the cloud. Concerns regarding data security and compliance are inhibitors to enterprises adopting the cloud, such as a multi-cloud environment, for remaining workloads that handle confidential and sensitive data.

Multi-cloud is utilization of multiple cloud services, such as, for example, computing, storage, and the like, in a single heterogeneous cloud architecture. Multi-cloud also refers to distribution of resources or assets, such as, for example, software applications, programs, and the like, across multiple cloud-hosting environments. With a typical multi-cloud infrastructure utilizing two or more clouds, such as, for example, public clouds, private clouds, hybrid clouds, or the like, a multi-cloud infrastructure tries to eliminate reliance on any single cloud provider. Multi-cloud differs from hybrid cloud in that multi-cloud refers to multiple cloud services rather than multiple cloud deployment models (e.g., public, private, and hybrid). Also, in a multi-cloud infrastructure, synchronization between different providers is not essential to complete processing or a transaction. For example, an entity, such as, for example, an enterprise, company, business, organization, institution, agency, or the like, may concurrently use different cloud providers for infrastructure, platform, and software services. Similarly, an entity may utilize different cloud providers for different workloads or may deploy a single workload load balanced across multiple providers.

SUMMARY

According to one illustrative embodiment, a computer-implemented method for certificate and key management is provided. A computer deploys a signed certificate corresponding to an enterprise to a plurality of cryptographic communication protocol endpoint proxies located in a heterogeneous distributed computing environment where a private key corresponding to the enterprise is not placed in any of the plurality of cryptographic communication protocol endpoint proxies. The computer, using a hardware security module of the computer, receives offload of cryptographic communications from the plurality of cryptographic communication protocol endpoint proxies to the hardware security module where the hardware security module verifies connection authenticity for the plurality of cryptographic communication protocol endpoint proxies across the heterogeneous distributed computing environment using the private key corresponding to the enterprise that remains within a security boundary of the hardware security module. According to other illustrative embodiments, a computer system and computer program product for certificate and key management are provided.

DETAILED DESCRIPTION

Figure 1:
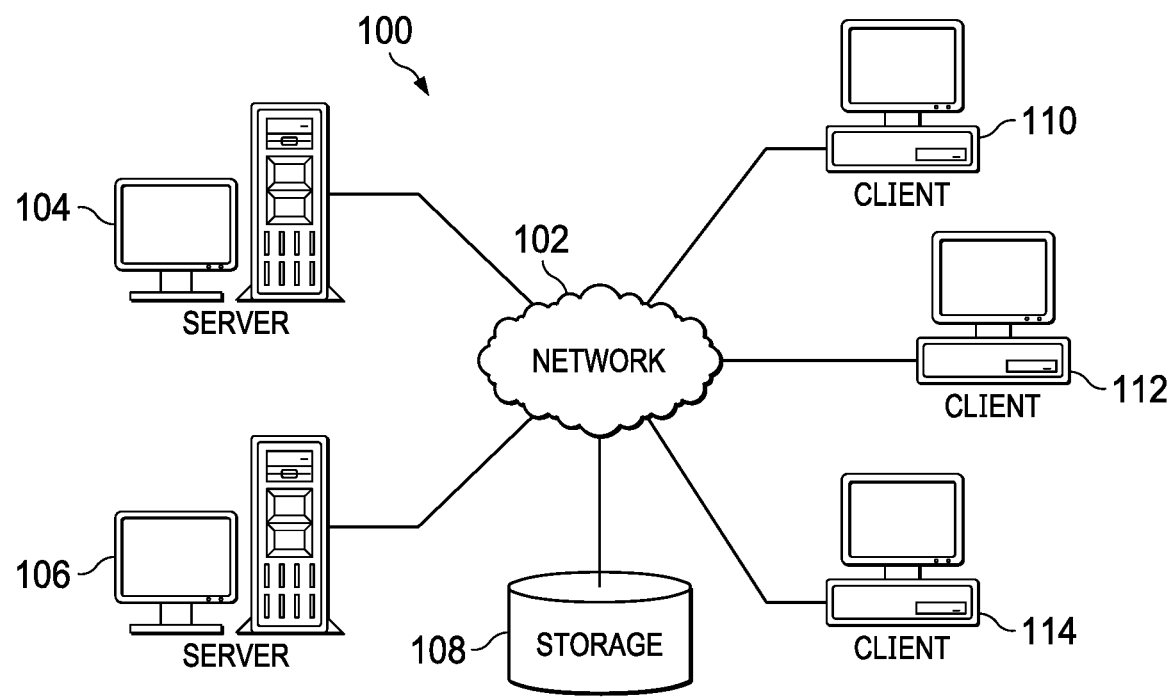
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 may be, for example, a heterogeneous distributed computing environment, such as a hybrid multi-cloud and edge environment comprised of a plurality of clouds corresponding to different cloud providers and a plurality of edge devices. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 provides one or more secure services for an enterprise, such as, for example, banking services, financial services, governmental services, educational services, data services, and the like, to users of client devices. Server 106 provides protection of the secure data that is in transit via network 102 using a hardware security module that enables exclusive control of cryptographic keys and certificates corresponding to the enterprise providing the secure services through server 104. Also, it should be noted that server 104 and server 106 may each represent multiple computing nodes in one or more cloud environments. Alternatively, server 104 and server 106 may each represent a cluster of servers in one or more data centers.

Client 110, client 112, and client 114 also connect to network 102. Clients 110, 112, and 114 are clients of server 104. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, kiosks, and the like, with wire or wireless communication links to network 102. Users of clients 110, 112, and 114 may utilize clients 110, 112, and 114 to access and utilize the secure services provided by server 104.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers and network addresses for a plurality of client devices, identifiers for a plurality of client device users, and the like. Furthermore, storage 108 may store other types of data, such as authentication or credential data that may include usernames, passwords, and biometric data associated with security operators and client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
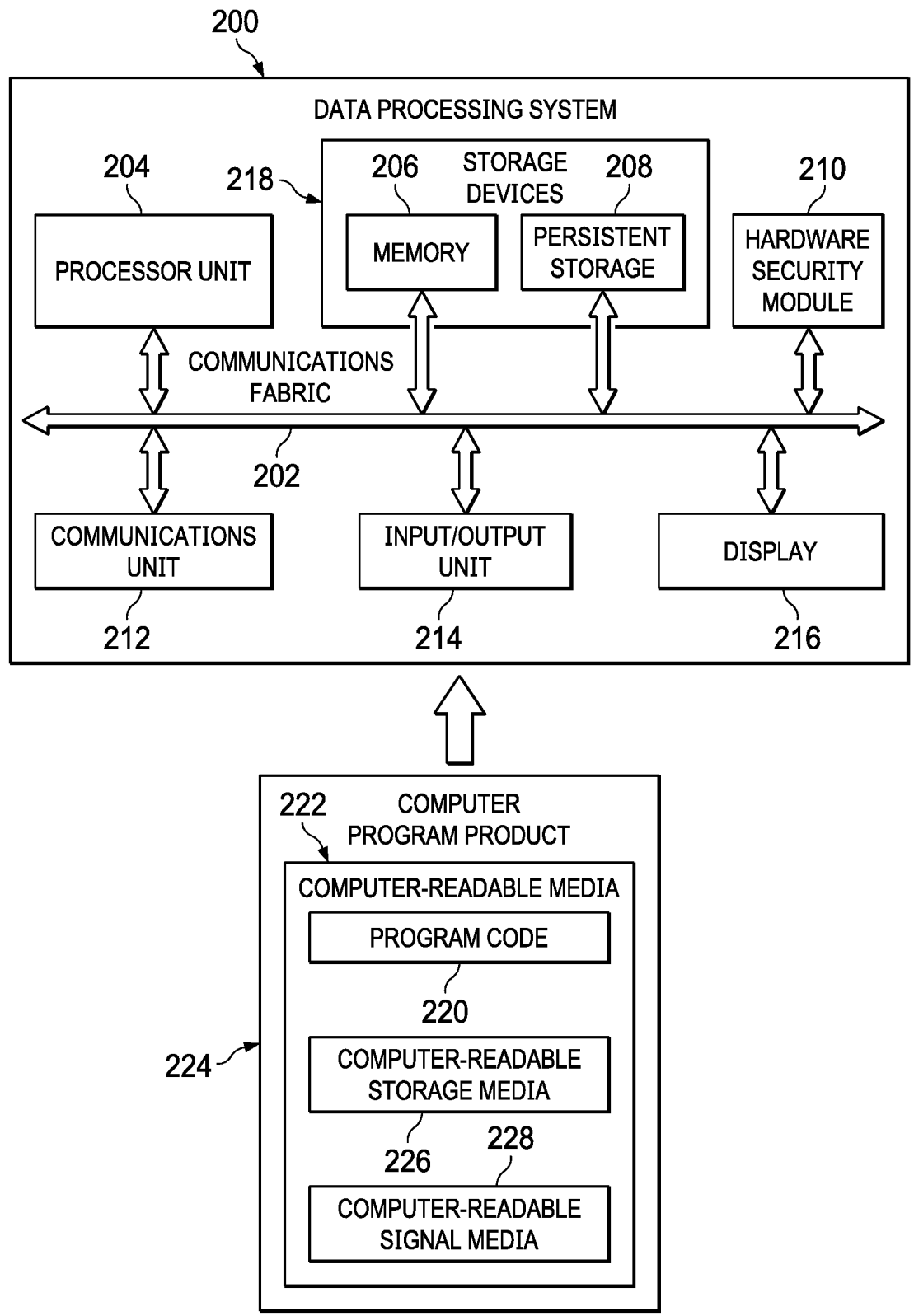
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 106 in FIG. 1, in which computer-readable program code or instructions implementing the digital certificate and key management processes of illustrative embodiments may be located. In this example, data processing system 200 includes communications fabric 202, which provides communications between processor unit 204, memory 206, persistent storage 208, hardware security module 210, communications unit 212, input/output (I/O) unit 214, and display 216.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 218. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Hardware security module 210 is a physical computing device that safeguards and manages cryptographic keys and performs encryption and decryption functions for digital signatures. In this example, hardware security module 210 is a plug-in card. Alternatively, hardware security module 210 is an external device coupled to data processing system 200. Hardware security module 210 contains a set of secure cryptoprocessor chips.

Hardware security module 210 enables protection of secure data that is in transit via a network, such as, for example, network 102 in FIG. 1, by providing exclusive control of cryptographic private keys corresponding to an enterprise across a heterogeneous distributed computing environment, such as a hybrid multi-cloud and edge environment comprised of a plurality of clouds corresponding to different cloud providers and a plurality of edge devices. The cryptographic private keys are generated within and never leave a security boundary of hardware security module 210 for an entire lifecycle of the keys.

As a result, data processing system 200 operates as a special purpose computer system in which hardware security module 210 in data processing system 200 enables secure management of digital certificates and keys across a hybrid multi-cloud and edge environment. In particular, hardware security module 210 transforms data processing system 200 into a special purpose computer system as compared to currently available general computer systems that do not have hardware security module 210.

Communications unit 212, in this example, provides for communication with other computers, data processing systems, and devices via a network, such as network 102 in FIG. 1. Communications unit 212 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 214 allows for the input and output of data with other devices that may be connected to data processing system 200. For example, input/output unit 214 may provide a connection for user input through a keypad, a keyboard, a mouse, a microphone, and/or some other suitable input device. Display 216 provides a mechanism to display information to a user and may include touch screen capabilities to allow the user to make on-screen selections through user interfaces or input data, for example.

Instructions for the operating system, applications, and/or programs may be located in storage devices 218, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
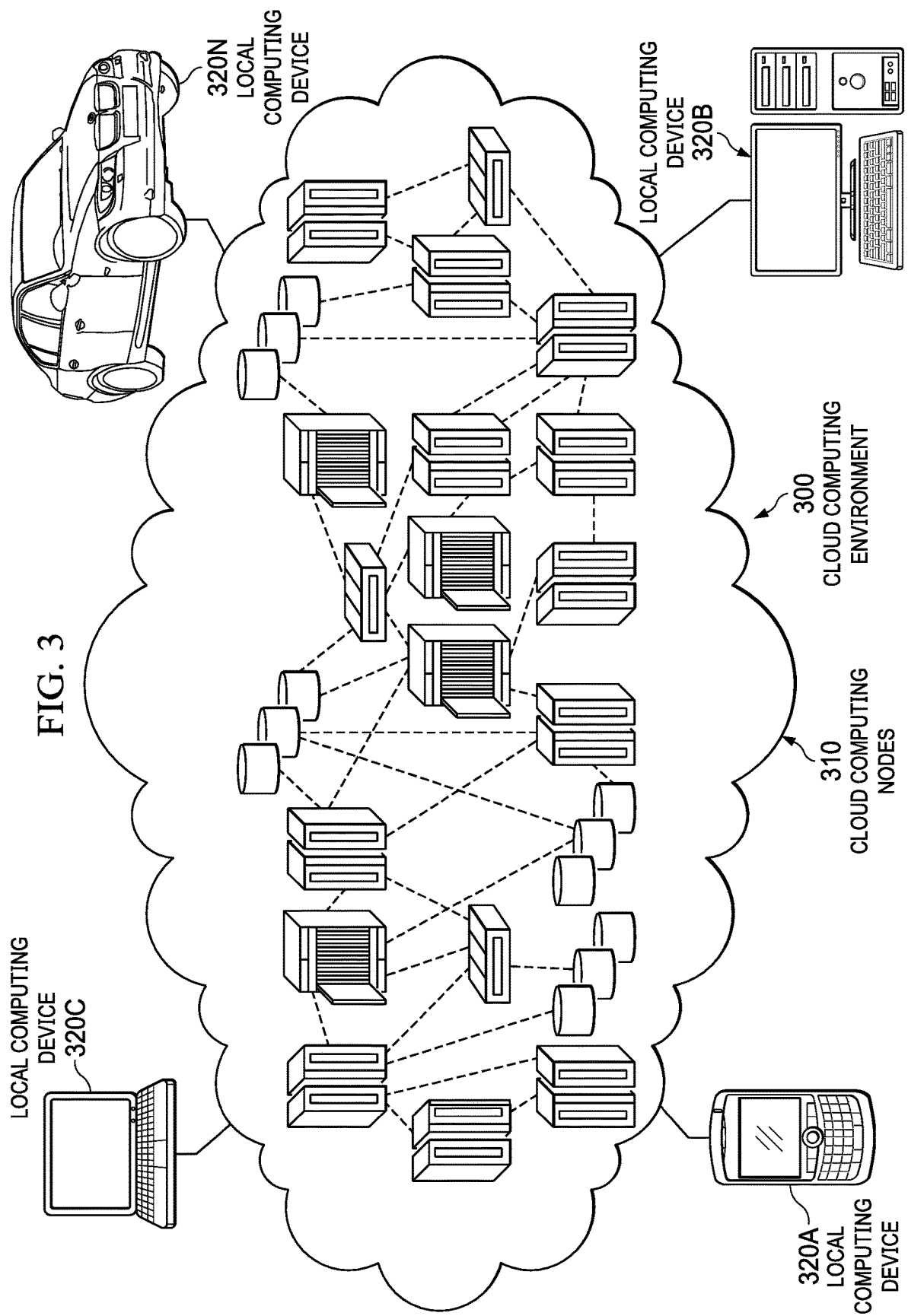
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
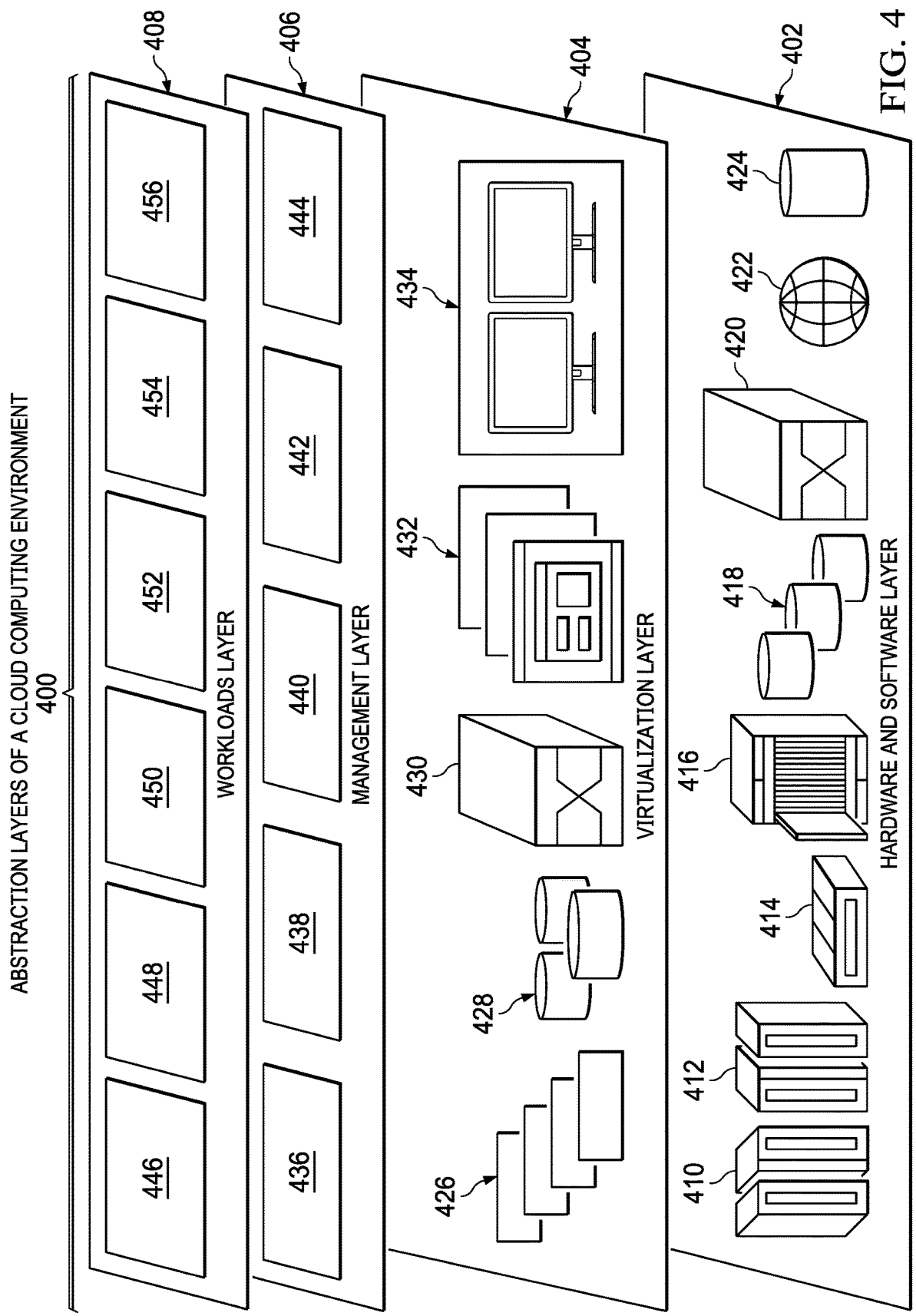
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and digital certificate and key management 456.

Protecting sensitive data while it is in transit via a computer network is critical to mitigate risk to the data and comply with regulatory requirements. Typically, Internet transactions occur over transport layer security (TLS) or secure socket layer (SSL) communication. TLS and SSL are cryptographic communication protocols designed to provide communications security over a computer network. In order to establish the TLS connection, a target network server needs to be trusted and verified. Digital certificates and their corresponding cryptographic keys, which are used to verify authenticity of target servers, are critical for providing trust and are also important to enterprises hosting applications providing different secure services.

For example, an enterprise, such as XYZ Bank, may have several network endpoints, such as XYZBank.com, XYZ Bank.com/business/account, XYZ Bank.com/personal/mortgage, XYZ Bank.com/transaction, and the like. In such a scenario, determining whether it is actually XYZ Bank's website is verified using a digital certificate. In cryptography, a digital certificate is an electronic document that is used to prove the ownership of a public key. The certificate includes information regarding the key, information regarding the identity of its owner, and a digital signature of a certificate issuer that has verified the certificate's contents. In a typical public key infrastructure scheme, the certificate issuer is a certificate authority. If the digital signature of the certificate issuer is valid, and the software application examining the certificate trusts the issuer, then the software application can use that key to communicate securely with the server corresponding to the certificate's owner.

It is important that the certificate and keys associated with that certificate are kept secure. If the certificate and corresponding keys are compromised, then a malicious entity can, for example, put up a fake website pretending to be XYZ Bank. As a result, certificates and keys associated with certificates are very sensitive data. Also, managing certificate lifecycle from certificate issuance to usage is important. Thus, private keys associated with enterprises should be kept within a hardware security module in cloud deployments for increased security.

For example, data security aware enterprises, such as, for example, banks, financial institutions, healthcare organizations, insurance companies, educational institutions, governmental agencies, and the like, want to ensure that these private keys are kept completely in their control especially in cloud deployments. Given that deployment of applications across hybrid multi-cloud and edge environments are increasing, managing these private keys with exclusive enterprise control across these hybrid multi-cloud and edge environments becomes a challenge. This is also true for distributed cloud deployments where some portions of the cloud are in a public cloud provider location, an enterprise on-premise location, and one or more other cloud type provider locations.

Currently enterprises can deploy hardware security modules on-premise. However, in cloud deployments across hybrid multi-cloud and edge environments integration of hardware security module functionality across these hybrid multi-cloud and edge environments across the entire lifecycle of key generation to certificate deployment, all backed up by a hardware security module, is not currently possible. For example, cloud providers can currently offer hardware security modules to generate key pairs, but cloud providers cannot integrate the hardware security modules with certificate and key management services from key pair generation, to certificate signing request, to signed certificate deployment, where the private keys of the certificates never leave the hardware security module, and only the customer can control the keys and hardware security module. Also, security providers can currently offer hardware security module services or certificate management services, but security providers cannot integrate these hardware security module and certificate management services across hybrid multi-cloud and edge environment deployments.

Illustrative embodiments enable certificate and key lifecycle management where the private key of the certificate does not leave the security boundary of a single hardware security module corresponding to a hybrid multi-cloud and edge environment. The single hardware security module generates a public/private key pair where the private key remains in the single hardware security module of the hybrid multi-cloud and edge environment. In addition, the single hardware security module generates a certificate signing request based on the generated public/private key pair. Further, a certificate manager of the hybrid multi-cloud and edge environment configures and deploys the signed certificate to a plurality of TLS endpoint proxies located in the hybrid multi-cloud and edge environment. However, the corresponding private key to the signed certificate is not sent to the TLS endpoint proxies to protect the private key from compromise. Instead, the private key remains in the single hardware security module.

The TLS endpoint proxies offload the TLS communications from the TLS endpoint proxies to the single hardware security module where the single hardware security module verifies TLS connection authenticity using the private key kept within the security boundary of the hardware security module. It should be noted that the single hardware security module is dedicated to a single enterprise. Furthermore, when the private key is removed from the single hardware security module, data of the enterprise is inaccessible because connection verification is no longer possible. As a result, illustrative embodiments enable the enterprise to have exclusive control of the private key corresponding to the certificate used in secure TLS communications across the hybrid multi-cloud and distributed cloud environment.

Illustrative embodiments provide the certificate and key management service, which is a single tenant service that includes the enterprise-controlled hardware security module, where the enterprise can exclusively control its own private key. In other words, illustrative embodiments provide a "keep your own key" service to enterprises. Illustrative embodiments enable enterprise exclusive control of the private key because only that enterprise can initiate a hardware security module key ceremony. A hardware security module key ceremony is a procedure where a master key is generated and loaded to initialize use of the hardware security module. A master key is at the top of a key hierarchy and is the root of trust to encrypt all other keys generated by the hardware security module. The hardware security module key ceremony is enabled via cloud native command line interfaces where two or more cloud key custodians of the enterprise initiate the master key so that no one else can access the hardware security module and master key other than the cloud key custodians.

The private keys corresponding to digital certificates are generated and destroyed in the hardware security module. The "keep your own key" key management service of illustrative embodiments, which includes the hardware security module, generates the public/private key pair corresponding to the enterprise. The hardware security module utilizes the generated public/private key pair to generate a certificate signing request for the enterprise. The enterprise sends the certificate signing request, which is based on the generated public/private key pair, to a certificate authority to obtain a signed digital certificate corresponding to the enterprise that is based on the certificate signing request. A certificate manager of the key management service of illustrative embodiments configures and deploys the signed digital certificate corresponding to the enterprise to a plurality of TLS endpoint proxies (e.g., software stacks) corresponding to the enterprise where TLS communication termination will occur. However, it should be noted that the private key of the enterprise is never sent to the plurality of TLS endpoint proxies and only remains in the hardware security module corresponding to that enterprise.

In other words, the certificate manager sends the signed digital certificate to the plurality of TLS endpoint proxies, which are located in a multi-cloud environment comprised of a plurality of clouds provided by different cloud providers (e.g., cloud A, cloud B, and cloud C corresponding to cloud provider 1, cloud provider 2, and cloud provider 3, respectively), without sending the private key of the enterprise to the plurality of TLS endpoint proxies where the TLS communication termination can be handled at the application level. The certificate manager can also apply the signed digital certificate to a plurality of TLS endpoint proxies corresponding to the enterprise in a distributed cloud environment where application clusters are managed from one location, such as, for example, a cloud satellite. A cloud satellite is an extension of a public cloud that can run inside the enterprise's on-premise location (e.g., data center), other cloud infrastructure, or edge devices (e.g., ATM machines, hospital monitors, payment kiosks, and the like) regardless of the cloud provider.

Thus, illustrative embodiments provide one or more technical solutions that overcome a technical problem with providing protection of secure data that is in transit via a network across heterogeneous distributed computing environments, such as, for example, multi-cloud environments comprised of a plurality of clouds corresponding to different cloud providers. As a result, these one or more technical solutions provide a technical effect and practical application in the field of data security.

Figure 5:
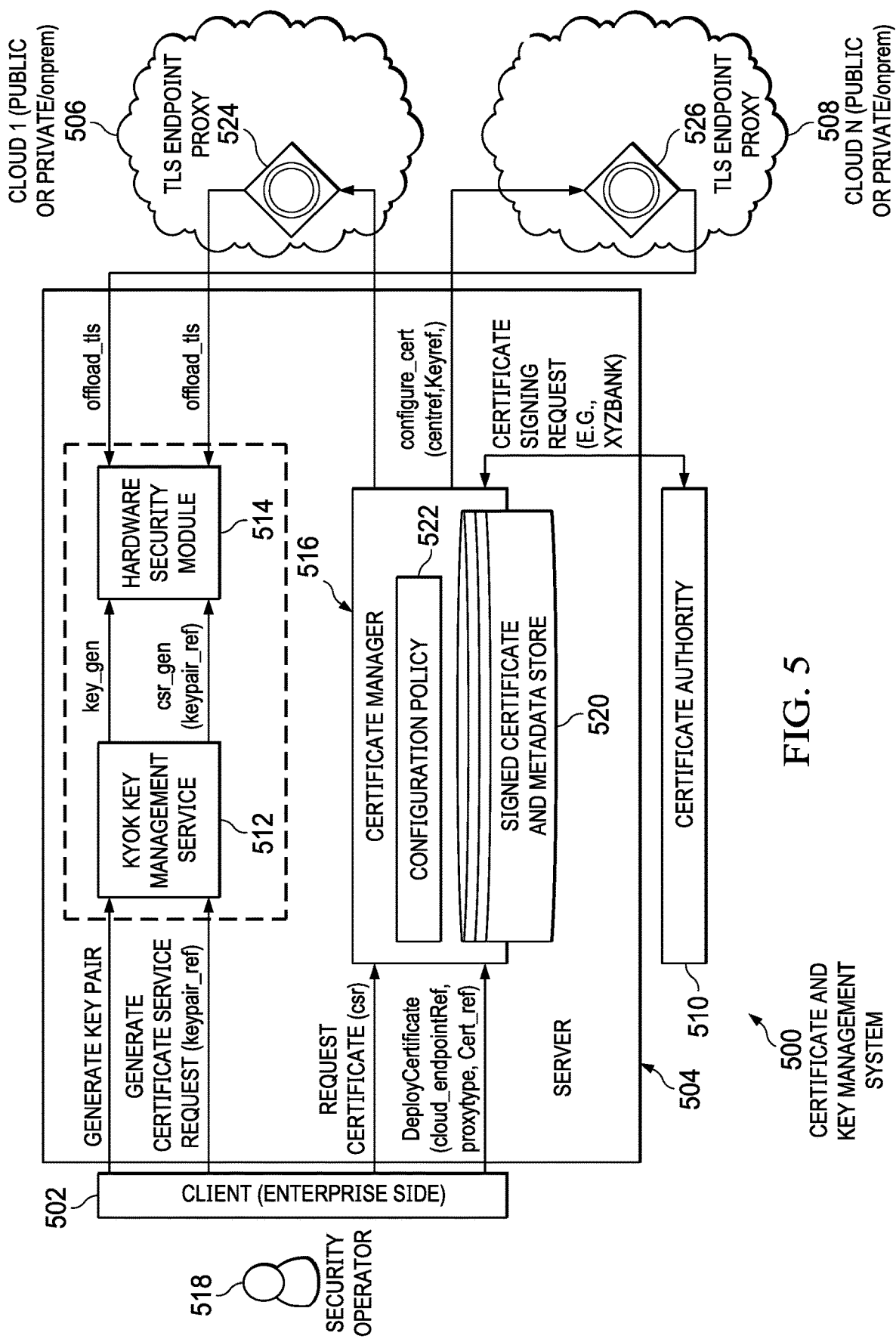
FIG. 5 is a diagram illustrating an example of a certificate and key management system in accordance with an illustrative embodiment.

With reference now to FIG. 5, a diagram illustrating an example of a certificate and key management system is depicted in accordance with an illustrative embodiment. Certificate and key management system 500 may be implemented in a network of data processing systems, such as network data processing system 100 in FIG. 1, or a cloud computing environment, such as cloud computing environment 300 in FIG. 3. Certificate and key management system 500 is a system of hardware and software components for providing protection of secure data that is in transit via a network using exclusive control of cryptographic keys and certificates across a multi-cloud environment comprised of a plurality of clouds corresponding to different cloud providers.

In this example, certificate and key management system 500 includes client 502, server 504, cloud 1 506 to cloud N 508, and certificate authority 510. However, it should be noted that certificate and key management system 500 is intended as an example only and not as a limitation on illustrative embodiments. For example, certificate and key management system 500 may include any number of client devices, clouds, certificate authorities, and the like.

Client 502 is a client device, such as, for example, client 110 in FIG. 1, and is an enterprise side client device. In other words, client 502 corresponds to a particular enterprise that provides a secure service using, for example, TLS communications. Server 504 may be, for example, server 106 in FIG. 1 or data processing system 200 in FIG. 2. Server 504 includes keep your own key (KYOK) key management service 512, hardware security module 514, and certificate manager 516. In this example, hardware security module 514 is included in includes KYOK key management service 512. Hardware security module 514 may be, for example, hardware security module 210 in FIG. 2.

Security operator 518 corresponds to the enterprise. Security operator 518 using client 502 sends a request to KYOK key management service 512 for hardware security module 514 to generate an asymmetric public key/private key pair corresponding to the enterprise. In response to the request, hardware security module 514 generates the asymmetric public key/private key pair, send the public key portion to client 502, and stores the private key portion in a security boundary of hardware security module 514 for an entire lifecycle of the private key. In other words, the private key corresponding to the enterprise never leaves the security boundary of hardware security module 514.

Subsequently, security operator 518 using client 502 sends a certificate signing request to KYOK key management service 512 for hardware security module 514 to digitally sign the certificate signing request. Hardware security module 514 digitally signs the certificate signing request using the private key of the enterprise, which is stored in hardware security module 514, and sends the digitally signed certificate signing request to client 502.

Afterward, security operator 518 using client 502 sends the digitally signed certificate signing request corresponding to the enterprise to certificate manager 516. In response to receiving the digitally signed certificate signing request, certificate manager 516 sends a request to certificate authority 510 to generate a digital certificate for the enterprise based on certificate content information contained in the digitally signed certificate signing request. In response to receiving the request, certificate authority 510 generates the digital certificate for the enterprise and then signs the digital certificate with its own private key. Afterward, certificate authority 510 sends the signed digital certificate of the enterprise to certificate manager 516. Certificate manager 516 stores the signed digital certificate of the enterprise in signed certificate and metadata store 520.

Subsequently, security operator 518 sends a request to deploy the signed digital certificate of the enterprise across cloud 1 506 to cloud N 508, which comprise a multi-cloud environment. In response to receiving the request, certificate manager 516 utilizes configuration policy 522 to configure the signed digital certificate for cloud 1 506 to cloud N 508. Upon configuration completion, certificate manager 516 deploys the signed digital certificate of the enterprise to TLS endpoint proxy 524 of cloud 1 506 and TLS endpoint proxy 526 of cloud N 508. Both TLS endpoint proxy 524 and TLS endpoint proxy 526 correspond to the enterprise. TLS endpoint proxy 524 and TLS endpoint proxy 526 handle TLS communications in their respective clouds for a set of secure services provided by the enterprise that are requested by users of client devices. However, TLS endpoint proxy 524 and TLS endpoint proxy 526 offload the TLS communications to hardware security module 514 to verify TLS connection authenticity for TLS endpoint proxies 524 and 526 in the multi-cloud environment using the private key of the enterprise that remains within a security boundary of hardware security module 514.

Figure 6:
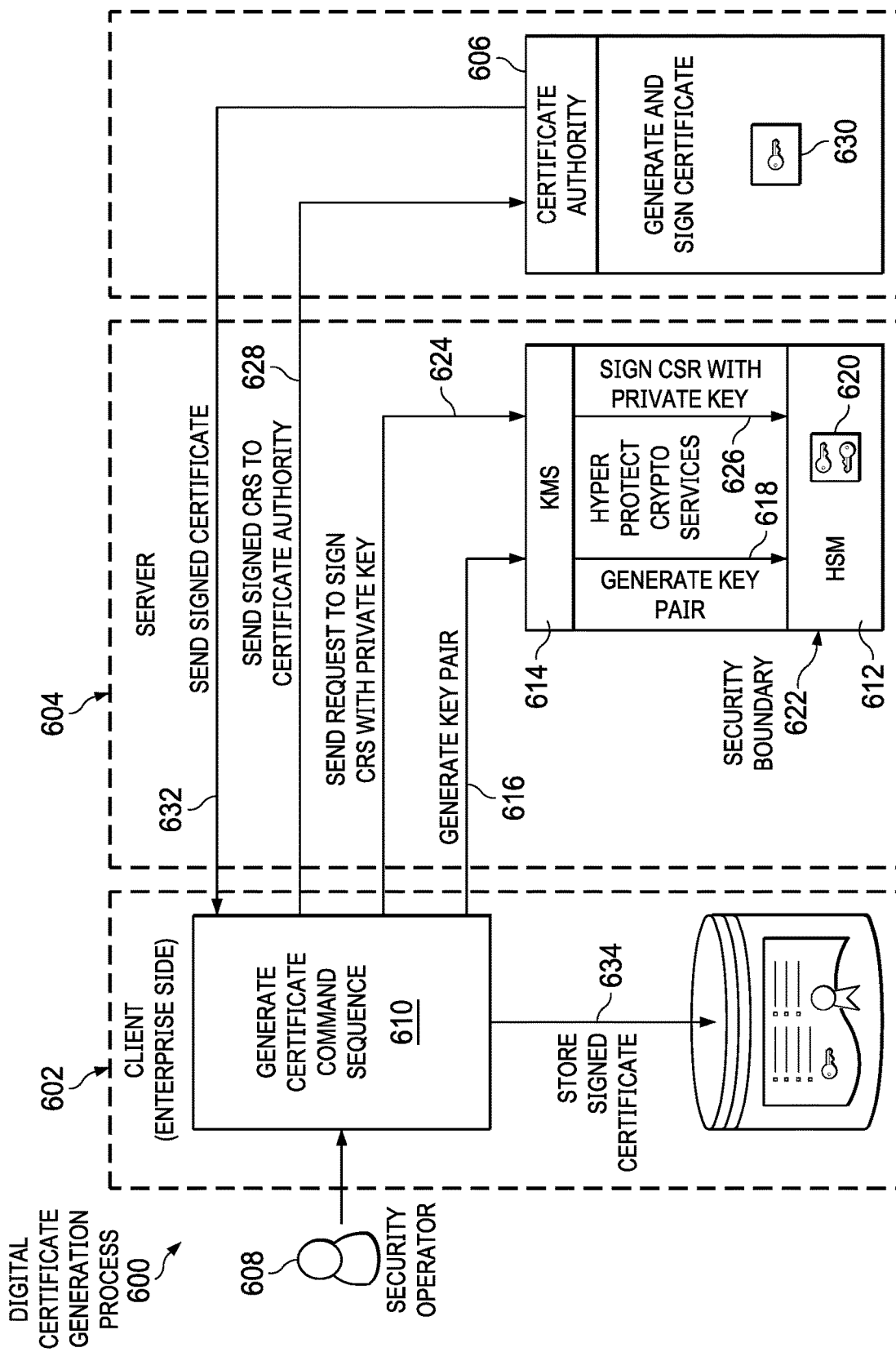
FIG. 6 is a diagram illustrating an example of a digital certificate generation process in accordance with an illustrative embodiment.

With reference now to FIG. 6, a diagram illustrating an example of a digital certificate generation process is shown in accordance with an illustrative embodiment. Digital certificate generation process 600 may be implemented in, for example, network data processing system 100 in FIG. 1, cloud computing environment 300 in FIG. 3, or certificate and key management system 500 in FIG. 5. In this example, digital certificate generation process 600 includes client 602, server 604, and certificate authority 606. However, digital certificate generation process 600 is intended as an example only and not as a limitation on illustrative embodiments. In other words, digital certificate generation process 600 may include any number of clients, servers, certificate authorities, and other components not shown.

Security operator 608 corresponds to an enterprise. Security operator 608 executes generate certificate command sequence 610 via client 602. Generate certificate command sequence 610 can be, for example, a script. Generate certificate command sequence 610 may include information, such as, for example, access credentials for hardware security module 612, which is included in key management service 614, a certificate store, and certificate authority 606. Generate certificate command sequence 610 may also include certificate content information, such as, for example, domain, owner, certificate use, country, state, locality, enterprise name, common name, email address, and the like.

At 616, generate certificate command sequence 610 requests hardware security module 612 to generate an asymmetric public key/private key pair corresponding to the enterprise. At 618, hardware security module 612 generates the asymmetric public key/private key pair using for example, Rivest-Shamir-Adleman cryptography, Elliptic Curve Cryptography, or the like. Hardware security module 612 stores public/private key pair 620 corresponding to the enterprise inside security boundary 622, which is, for example, Federal Information Processing Standard certified. Hardware security module 612 sends the public key of public/private key pair 620 to client 602.

Security operator 608 prepares a certificate signing request using the certificate content information above. At 624, security operator 608 using client 602 sends a request to sign the certificate signing request to hardware security module 612. At 626, hardware security module 612 signs the certificate signing request with the private key of public/private key pair 620. Hardware security module 612 sends the signed certificate signing request to client 602.

At 628, security operator 608 using client 602 sends the signed certificate signing request to certificate authority 606. Certificate authority 606 generates a digital certificate for the enterprise based on the certificate content information in the signed certificate signing request, which hardware security module 612 signed with the private key of the enterprise, received from client 602. Certificate authority 606 signs the digital certificate of the enterprise with its own private key 630. At 632, certificate authority 606 sends the signed digital certificate to client 602. At 634, client 602 stores the signed digital certificate of the enterprise.

Figure 7:
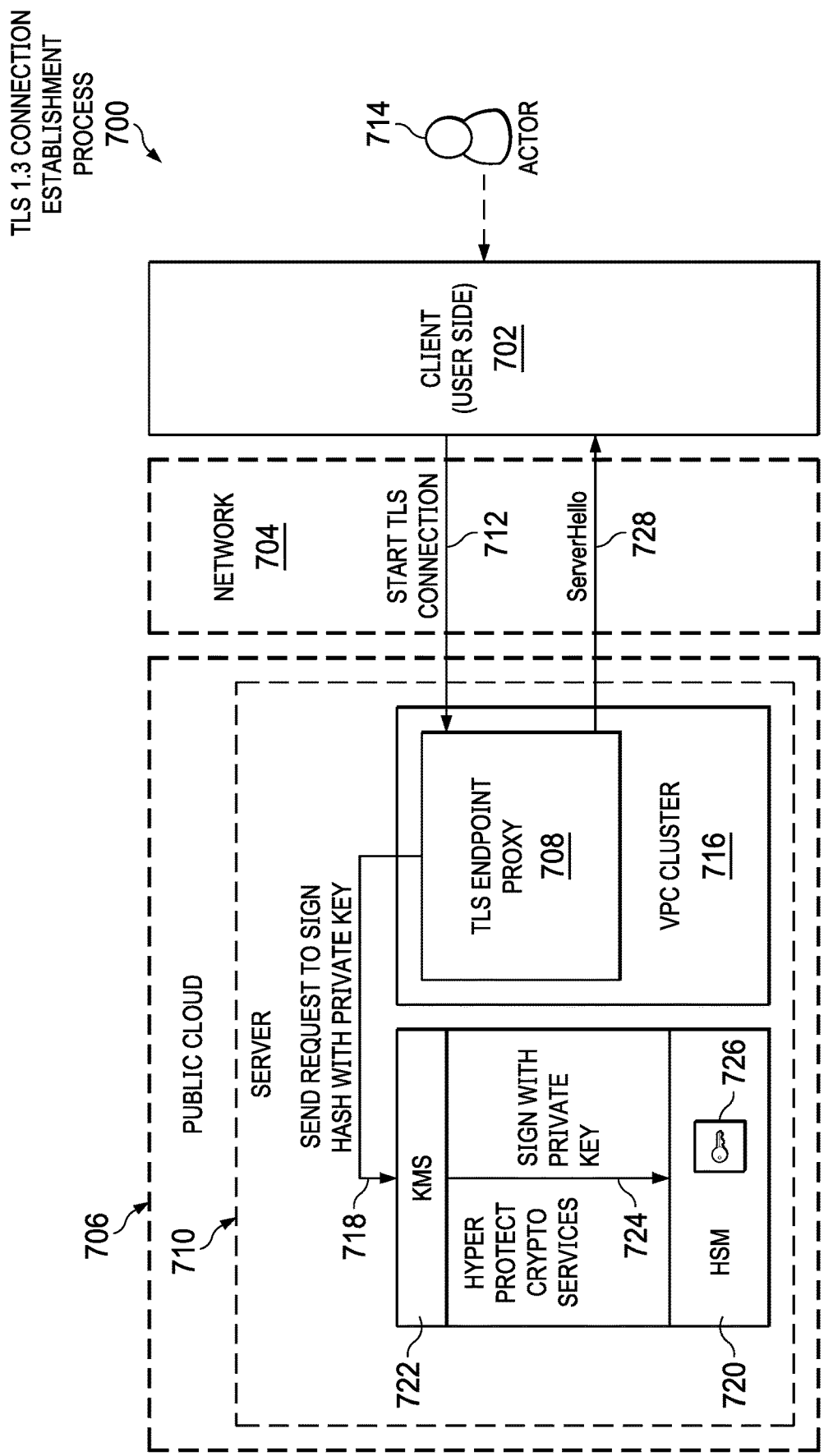
FIG. 7 is a diagram illustrating an example of a TLS 1.3 connection establishment process in accordance with an illustrative embodiment.

With reference now to FIG. 7, a diagram illustrating an example of a TLS 1.3 connection establishment process is shown in accordance with an illustrative embodiment. TLS 1.3 connection establishment process 700 may be implemented in, for example, network data processing system 100 in FIG. 1, cloud computing environment 300 in FIG. 3, or certificate and key management system 500 in FIG. 5. In this example, TLS 1.3 connection establishment process 700 includes client 702, network 704, public cloud 706, TLS endpoint proxy 708, and server 710. However, TLS 1.3 connection establishment process 700 is intended as an example only and not as a limitation on illustrative embodiments. In other words, TLS 1.3 connection establishment process 700 may include any number of clients, networks, clouds, TLS endpoint proxies, servers, and other components not shown.

At 712, actor 714 using client 702 starts a TLS connection with TLS endpoint proxy 708 via network 704. In this example, actor 714 is a human user. However, it should be noted that actor 714 may be a software application. TLS endpoint proxy 708 corresponds to an enterprise, such as, for example, XYZ Bank. TLS endpoint proxy 708 is included in virtual private cloud cluster 716, which corresponds to the enterprise, within server 710. Server 710 may represent a set of servers. Server 710 resides in public cloud 706. Public cloud 706 may be provided by any cloud provider. Actor 714 is a customer of the enterprise and is using the TLS connection to access a set of sensitive data associated with the enterprise, such as, for example, checking account balance of actor 714 at XYZ Bank. Client 702 provides standard TLS 1.3 information in the client hello message, such as, for example, supported cipher suites, key agreement protocol, key share, and the like.

Based on the TLS 1.3 information provided by client 702 in the client hello message, TLS endpoint proxy 708 generates a base point G on an elliptic curve and a cryptographic nonce to calculate a hash, which is a digest of all handshake messages between client 702 and server 710, that is being made known to client 702 and server 710. At 718, TLS endpoint proxy 708 sends a request to sign the hash of the digest of all handshake messages to hardware security module 720, which is included in key management service 722. At 724, hardware security module 720 signs the hash of the digest of all handshake messages using private key 726, which is generated and kept within the security boundary of hardware security module 720 only.

Hardware security module 720 sends the signed hash of the digest of all handshake messages to TLS endpoint proxy 708. TLS endpoint proxy 708 includes the signed hash of the digest of all handshake messages in a server hello message, along with key agreement protocol, key share, and the like. At 728, TLS endpoint proxy 708 sends the server hello message, which contains the signed hash of the digest of all handshake messages, key agreement protocol, and key share, to client 702.

Client 702 can optionally verify the validity of a digital signature of the signed hash using a public key, which corresponds to the private key, in the certificate. In addition, client 702 can optionally verify the validity of a digital signature of the certificate.

Figure 8:
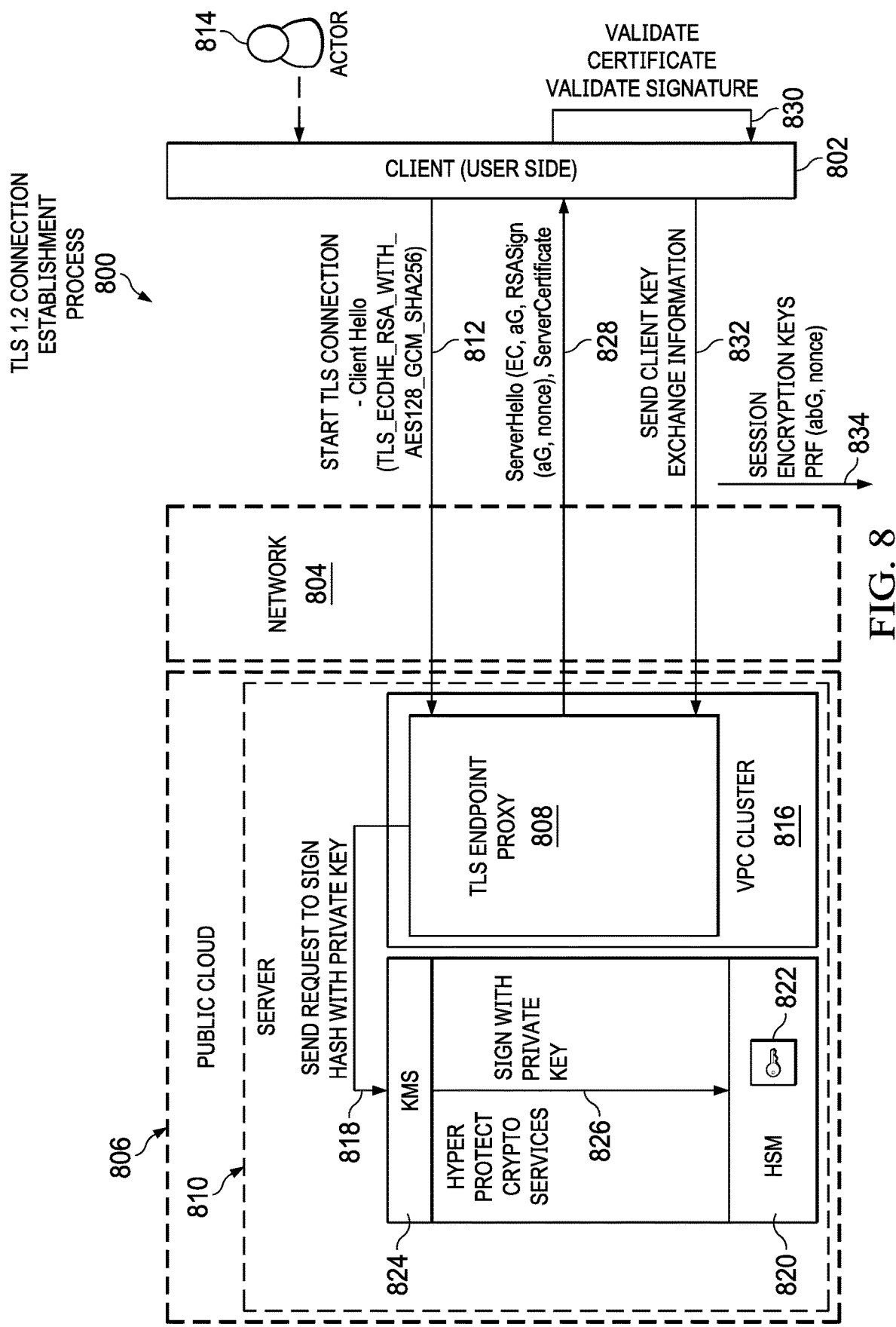
FIG. 8 is a diagram illustrating an example of a TLS 1.2 connection establishment process in accordance with an illustrative embodiment.

With reference now to FIG. 8, a diagram illustrating an example of a TLS 1.2 connection establishment process is shown in accordance with an illustrative embodiment. TLS 1.2 connection establishment process 800 may be implemented in, for example, network data processing system 100 in FIG. 1, cloud computing environment 300 in FIG. 3, or certificate and key management system 500 in FIG. 5. In this example, TLS 1.2 connection establishment process 800 includes client 802, network 804, public cloud 806, TLS endpoint proxy 808, and server 810. However, TLS 1.2 connection establishment process 800 is intended as an example only and not as a limitation on illustrative embodiments. In other words, TLS 1.2 connection establishment process 800 may include any number of clients, networks, clouds, TLS endpoint proxies, servers, and other components not shown.

At 812, actor 814 using client 802 starts a TLS connection with TLS endpoint proxy 808 via network 804. TLS endpoint proxy 808 is included in virtual private cloud cluster 816, which corresponds to an enterprise, within server 810. Server 810 resides in public cloud 806. Public cloud 806 may be provided by any cloud provider. Actor 814 utilizes the TLS connection to access a set of sensitive data associated with the enterprise. Client 802 sends a client hello message that includes, for example, protocol version, client random data used later in the handshake, an optional session identifier to resume, a list of cipher suites, a list of compression methods, a list of extensions, and the like, to TLS endpoint proxy 808.

TLS endpoint proxy 808 implements a server hello message, server certificate message, and server key exchange generation. The server hello message includes, for example, selected protocol version, server random data used later in the handshake, session identifier, selected cipher suite, selected compression method, list of extensions, and the like. The server certificate message includes a digital certificate containing, for example, host name of server 810, public key used by server 810, proof from a certificate authority that the owner of the host name holds the private key for the public key, and the like. The server key exchange generation includes TLS endpoint proxy 808 calculating a public/private key pair for key exchange using, for example, an elliptical curve method.

At 818, TLS endpoint proxy 808 sends a request to hardware security module 830 to sign the public key, which was generated during the server key exchange generation process above, using private key 822. It should be noted that private key 822 never leaves the security boundary of hardware security module 830. Hardware security module 830 is included in key management service 824.

At 826, hardware security module 830 signs the public key with private key 822. Afterward, hardware security module 830 sends the signed public key to TLS endpoint proxy 808. TLS endpoint proxy 808 then prepares a server key exchange message that includes the signed public key by hardware security module 820 using private key 822. As part of the key exchange process both server 810 and client 802 will have a key pair of public and private keys and will send the other party their public key. The shared encryption key will then be generated using a combination of each party's private key and the other party's public key. The parties have agreed on a selected cipher suite meaning the key pairs will be based on the selected cipher suite rather than using the public/private key pair from the certificate.

At 828, TLS endpoint proxy 808 sends the server hello message, the server certificate message, the server key exchange message, and a server hello done message to client 802. The server hello done message indicates server 810 is finished with its half of the handshake. At 830, client 802 validates the server certificate and validates the signature of the signed public key. In response to successfully validating the server certificate and the signature of the signed public key, client 802 continues with TLS connection establishment. At 832, client 802 sends client key exchange information to TLS endpoint proxy 808. At 834, both client 802 and TLS endpoint proxy 808 calculate session encryption keys and utilize the session encryption keys for secure communication between client 802 and TLS endpoint proxy 808.

Figure 9:
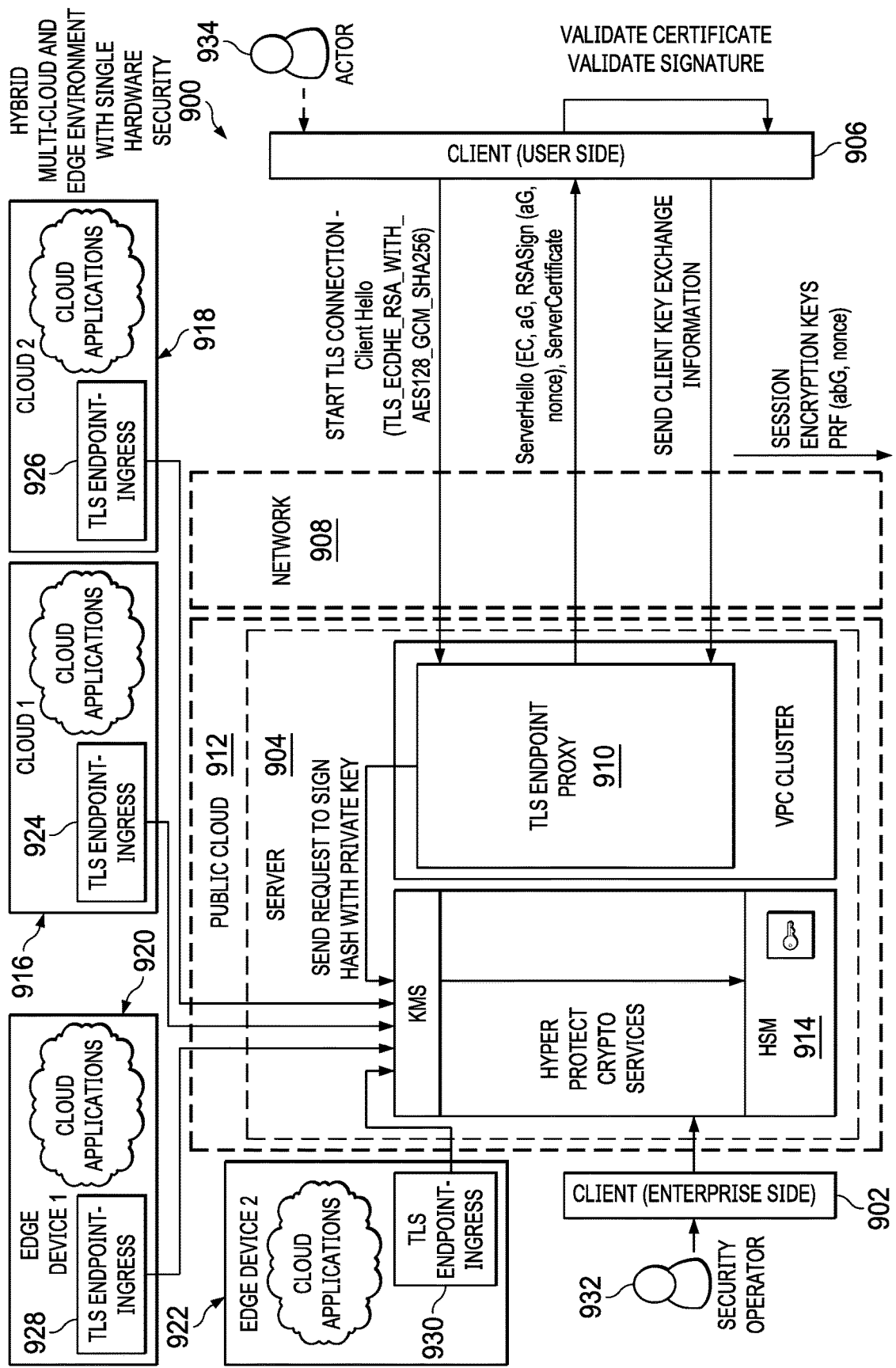
FIG. 9 is a diagram illustrating an example of a hybrid multi-cloud and edge environment with a single hardware security module in accordance with an illustrative embodiment.

With reference now to FIG. 9, a diagram illustrating an example of a hybrid multi-cloud and edge environment with a single hardware security module is shown in accordance with an illustrative embodiment. In this example, hybrid multi-cloud and edge environment with a single hardware security module 900 includes client 902, server 904, client 906, network 908, TLS endpoint proxy 910, public cloud 912, hardware security module 914, cloud 1 916, cloud 2 918, edge device 1 920, edge device 2 922, TLS endpoint proxy 924, TLS endpoint proxy 926, TLS endpoint proxy 928, and TLS endpoint proxy 930. However, hybrid multi-cloud and edge environment with a single hardware security module 900 is intended as an example only and not as a limitation on illustrative embodiments. In other words, hybrid multi-cloud and edge environment with a single hardware security module 900 may include any number of clients, servers, networks, clouds, edge devices, TLS endpoint proxies, and other components not shown. However, it should be noted that hybrid multi-cloud and edge environment with a single hardware security module 900 only includes one hardware security module (i.e., hardware security module 914 of server 904 in public cloud 912). Further, it should be noted that each of TLS endpoint proxy 910, TLS endpoint proxy 924, TLS endpoint proxy 926, TLS endpoint proxy 928, and TLS endpoint proxy 930 correspond to an enterprise. Furthermore, each of TLS endpoint proxy 910, TLS endpoint proxy 924, TLS endpoint proxy 926, TLS endpoint proxy 928, and TLS endpoint proxy 930 connect with hardware security module 914 to offload TLS communications from the plurality of TLS endpoint proxies, which are located in the different clouds and edge devices, to hardware security module 914 where hardware security module 914 verifies TLS connection authenticity for the plurality of TLS endpoint proxies across the hybrid multi-cloud and edge environment using a private key corresponding to the enterprise that remains within a security boundary of hardware security module 914 only. Moreover, security operator 932, who corresponds with the enterprise, executes digital certificate generation for all of them. Actor 934 initiates TLS communications with at least one of TLS endpoint proxy 910, TLS endpoint proxy 924, TLS endpoint proxy 926, TLS endpoint proxy 928, or TLS endpoint proxy 930 to access sensitive data corresponding to the enterprise via at least one of a virtual private cloud of the enterprise in public cloud 912, cloud 1 916, cloud 2 918, edge device 1 920, or edge device 2 922. Edge device 1 920 and edge device 2 922 may represent any type of edge device, such as, for example, a standalone computer, an ATM machine, kiosk, or the like with data processing capabilities.

Figure 10:
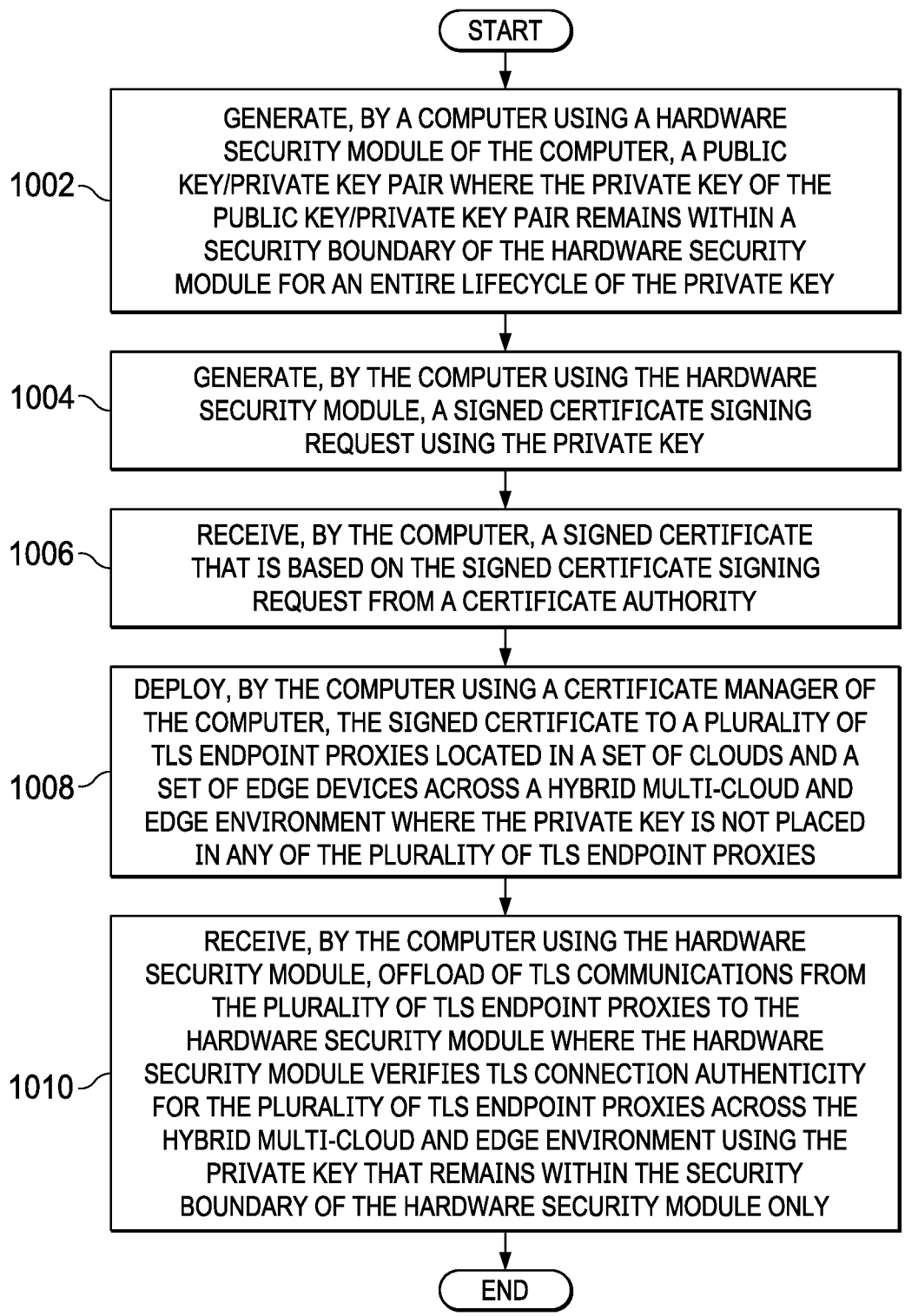
FIG. 10 is a flowchart illustrating a process for digital certificate and key management in a hybrid multi-cloud and edge environment in accordance with an illustrative embodiment.

With reference now to FIG. 10, a flowchart illustrating a process for digital certificate and key management in a hybrid multi-cloud and edge environment is shown in accordance with an illustrative embodiment. The process shown in FIG. 10 may be implemented in a computer, such as, for example, server 104 in FIG. 1, data processing system 200 in FIG. 2, a computing node of cloud computing nodes 310 in FIG. 3, server 504 in FIG. 5, server 604 in FIG. 6, server 710 in FIG. 7, server 810 in FIG. 8, or server 904 in FIG. 9.

The process begins when the computer, using a hardware security module of the computer, generates a public key/private key pair where the private key of the public key/private key pair remains within a security boundary of the hardware security module for an entire lifecycle of the private key (step 1002). The computer, using the hardware security module, generates a signed certificate signing request using the private key (step 1004). The computer receives a signed certificate that is based on the signed certificate signing request from a certificate authority (step 1006).

The computer, using a certificate manager of the computer, deploys the signed certificate to a plurality of TLS endpoint proxies located in a set of clouds and a set of edge devices across a hybrid multi-cloud and edge environment where the private key is not placed in any of the plurality of TLS endpoint proxies (step 1008). The computer, using the hardware security module, receives offload of TLS communications from the plurality of TLS endpoint proxies to the hardware security module where the hardware security module verifies TLS connection authenticity for the plurality of TLS endpoint proxies across the hybrid multi-cloud and edge environment using the private key that remains within the security boundary of the hardware security module only (step 1010). Thereafter, the process terminates.

Figure 11:
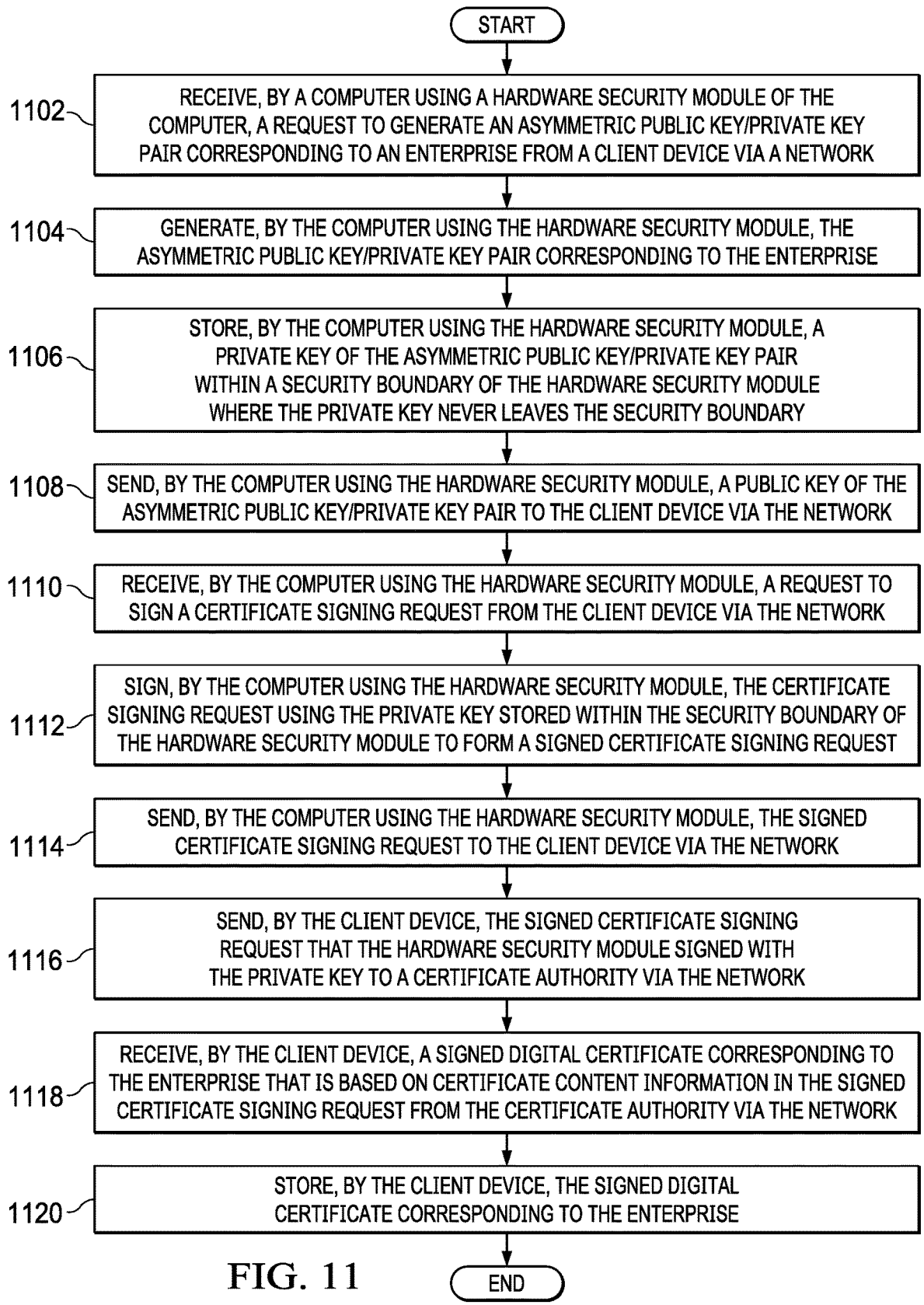
FIG. 11 is a flowchart illustrating a process for generating a digital certificate in accordance with an illustrative embodiment.

With reference now to FIG. 11, a flowchart illustrating a process for generating a digital certificate is shown in accordance with an illustrative embodiment. The process shown in FIG. 11 may be implemented in a computer, such as, for example, server 104 in FIG. 1, data processing system 200 in FIG. 2, a computing node of cloud computing nodes 310 in FIG. 3, or server 604 in FIG. 6.

The process begins when the computer, using a hardware security module of the computer, receives a request to generate an asymmetric public key/private key pair corresponding to an enterprise from a client device via a network (step 1102). In response to receiving the request, the computer, using the hardware security module, generates the asymmetric public key/private key pair corresponding to the enterprise (step 1104).

The computer, using the hardware security module, stores a private key of the asymmetric public key/private key pair within a security boundary of the hardware security module where the private key never leaves the security boundary (step 1106). The computer, using the hardware security module, sends a public key of the asymmetric public key/private key pair to the client device via the network (step 1108).

The computer, using the hardware security module, receives a request to sign a certificate signing request from the client device via the network (step 1110). In response to receiving the request, the computer, using the hardware security module, signs the certificate signing request using the private key stored within the security boundary of the hardware security module to form a signed certificate signing request (step 1112). The computer, using the hardware security module, sends the signed certificate signing request to the client device via the network (step 1114).

The client device sends the signed certificate signing request that the hardware security module signed with the private key to a certificate authority via the network (step 1116). Subsequently, the client device receives a signed digital certificate corresponding to the enterprise that is based on certificate content information in the signed certificate signing request from the certificate authority via the network (step 1118). The client device stores the signed digital certificate corresponding to the enterprise (step 1120). Thereafter, the process terminates.

Figure 12:
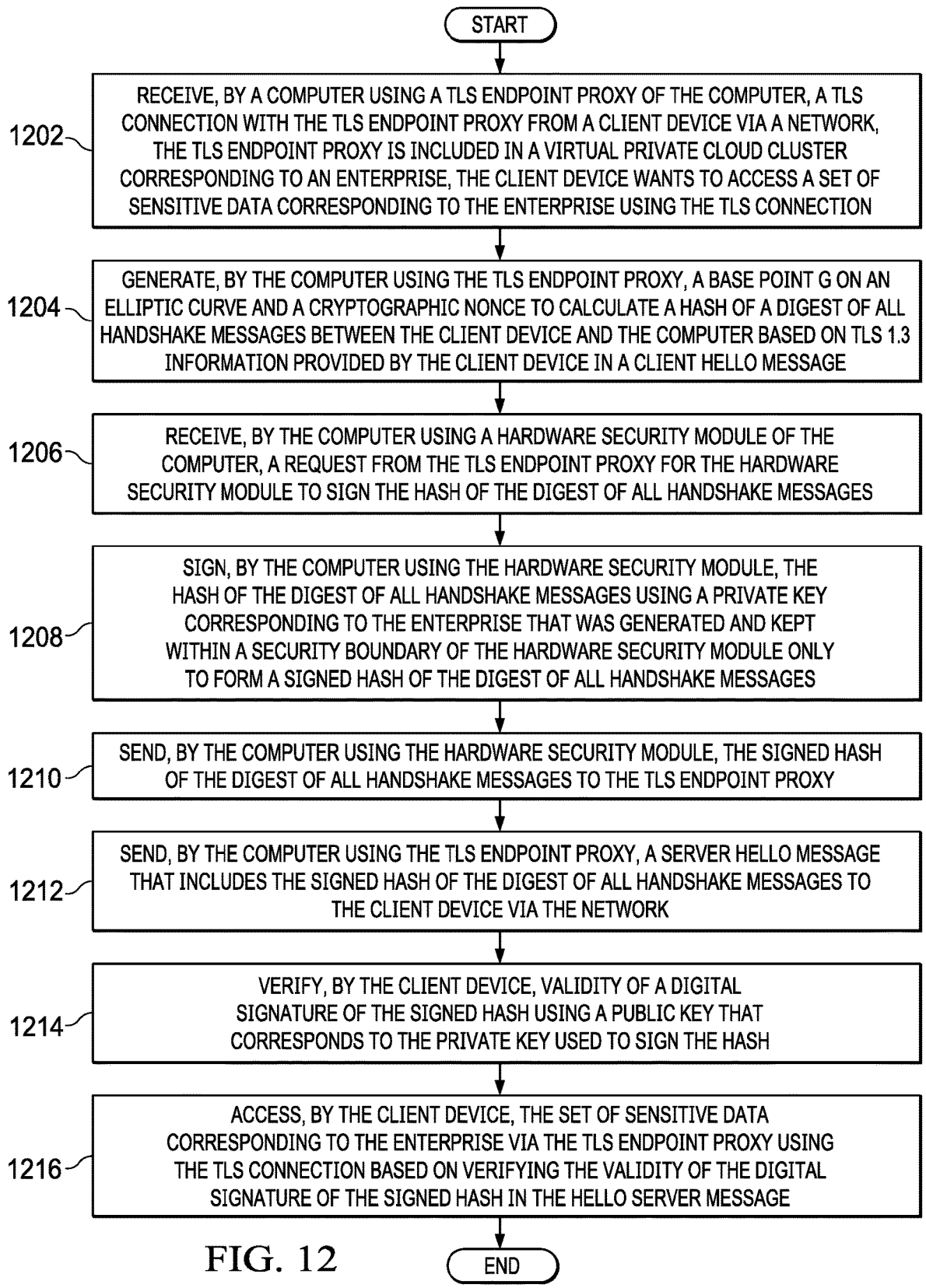
FIG. 12 is a flowchart illustrating a process for establishing a TLS 1.3 connection in accordance with an illustrative embodiment.

With reference now to FIG. 12, a flowchart illustrating a process for establishing a TLS 1.3 connection is shown in accordance with an illustrative embodiment. The process shown in FIG. 12 may be implemented in a computer, such as, for example, server 104 in FIG. 1, data processing system 200 in FIG. 2, a computing node of cloud computing nodes 310 in FIG. 3, or server 710 in FIG. 7.

The process begins when the computer, using a TLS endpoint proxy of the computer, receives a TLS connection with the TLS endpoint proxy from a client device via a network where the TLS endpoint proxy is included in a virtual private cloud cluster corresponding to an enterprise and the client device wants to access a set of sensitive data corresponding to the enterprise using the TLS connection (step 1202). In response to receiving the connection, the computer, using the TLS endpoint proxy, generates a base point G on an elliptic curve and a cryptographic nonce to calculate a hash of a digest of all handshake messages between the client device and the computer based on TLS 1.3 information provided by the client device in a client hello message (step 1204).

Afterward, the computer, using a hardware security module of the computer, receives a request from the TLS endpoint proxy for the hardware security module to sign the hash of the digest of all handshake messages (step 1206). In response to receiving the request, the computer, using the hardware security module, signs the hash of the digest of all handshake messages using a private key corresponding to the enterprise that was generated and kept within a security boundary of the hardware security module only to form a signed hash of the digest of all handshake messages (step 1208).

The computer, using the hardware security module, sends the signed hash of the digest of all handshake messages to the TLS endpoint proxy (step 1210). The computer, using the TLS endpoint proxy, sends a server hello message that includes the signed hash of the digest of all handshake messages to the client device via the network (step 1212).

The client device verifies validity of a digital signature of the signed hash using a public key that corresponds to the private key used to sign the hash (step 1214). The client device accesses the set of sensitive data corresponding to the enterprise via the TLS endpoint proxy using the TLS connection based on verifying the validity of the digital signature of the signed hash in the hello server message (step 1216). Thereafter, the process terminates.

Figure 13A:
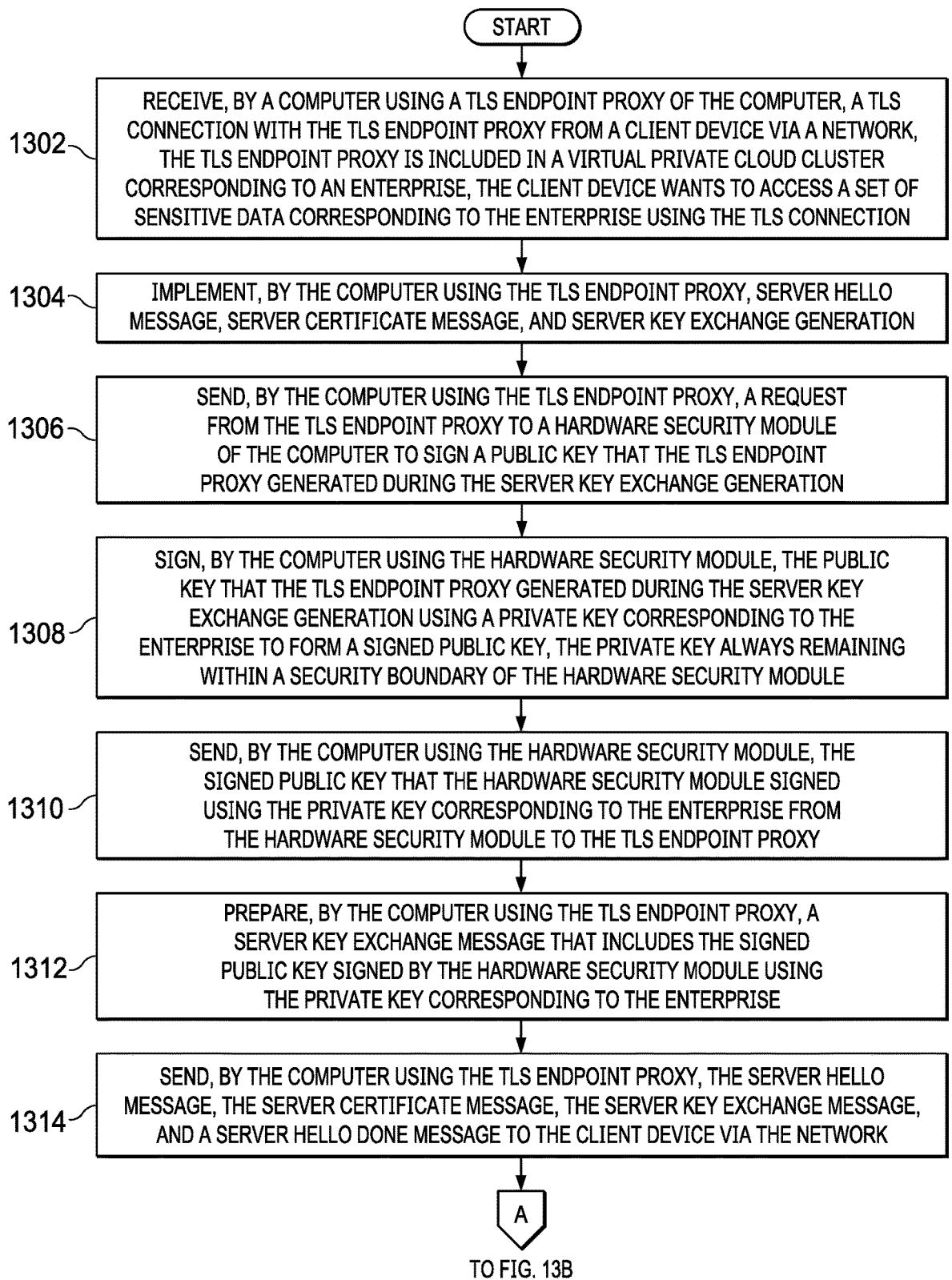
FIGS. 13A-13B are a flowchart illustrating a process for establishing a TLS 1.2 connection in accordance with an illustrative embodiment.
Figure 13B:
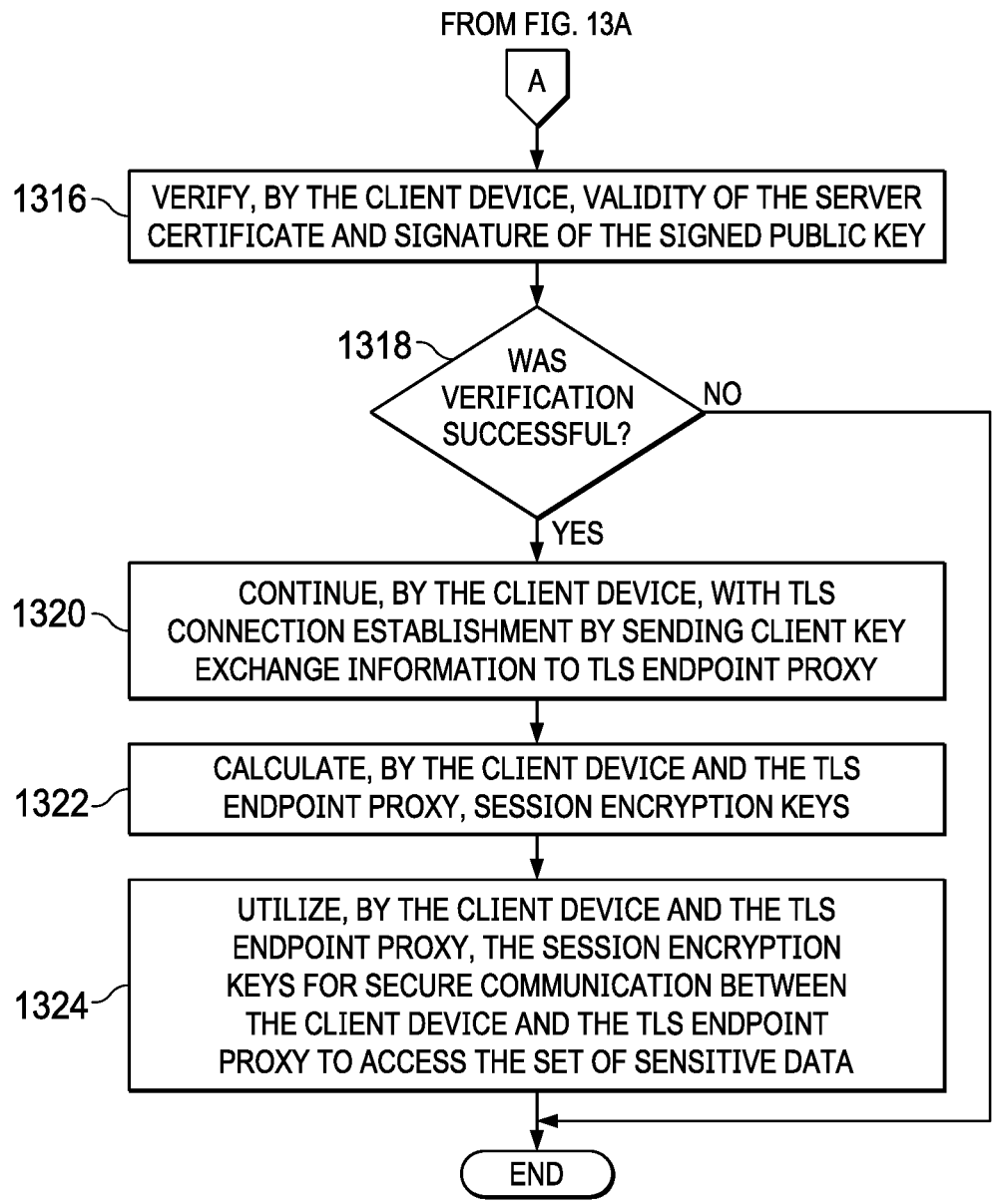

With reference now to FIGS. 13A-13B, a flowchart illustrating a process for establishing a TLS 1.2 connection is shown in accordance with an illustrative embodiment. The process shown in FIGS. 13A-13B may be implemented in a computer, such as, for example, server 104 in FIG. 1, data processing system 200 in FIG. 2, a computing node of cloud computing nodes 310 in FIG. 3, or server 810 in FIG. 8.

The process begins when the computer, using a TLS endpoint proxy of the computer, receives a TLS connection with the TLS endpoint proxy from a client device via a network where the TLS endpoint proxy is included in a virtual private cloud cluster corresponding to an enterprise and the client device wants to access a set of sensitive data corresponding to the enterprise using the TLS connection (step 1302). In response to receiving the TLS connection, the computer, using the TLS endpoint proxy, implements a server hello message, server certificate message, and server key exchange generation (step 1304).

Afterward, the computer, using the TLS endpoint proxy, sends a request from the TLS endpoint proxy to a hardware security module of the computer to sign a public key that the TLS endpoint proxy generated during implementation of the server key exchange generation (step 1306). In response to receiving the request, the computer, using the hardware security module, signs the public key that the TLS endpoint proxy generated during implementation of the server key exchange generation using a private key corresponding to the enterprise to form a signed public key (step 1308). The private key always has and always will remain within a security boundary of the hardware security module for an entire lifecycle of the private key.

The computer, using the hardware security module, sends the signed public key that the hardware security module signed using the private key corresponding to the enterprise from the hardware security module to the TLS endpoint proxy (step 1310). The computer, using the TLS endpoint proxy, prepares a server key exchange message that includes the signed public key signed by the hardware security module using the private key corresponding to the enterprise (step 1312). The computer, using the TLS endpoint proxy, sends the server hello message, the server certificate message, the server key exchange message, and a server hello done message to the client device via the network (step 1314).

In response to receiving the server hello message, the server certificate message, the server key exchange message, and the server hello done message, the client device verifies validity of a server certificate contained in the server certificate message and a signature of the signed public key (step 1316). Subsequently, the client device makes a determination as to whether verification of the server certificate and the signature of the signed public key was successful (step 1318).

If the client device determines that the verification of the server certificate and the signature of the signed public key was not successful, no output of step 1318, then the process terminates thereafter. If the client device determines that the verification of the server certificate and the signature of the signed public key was successful, yes output of step 1318, then the client device continues with TLS connection establishment by sending client key exchange information to TLS endpoint proxy (step 1320). The client device and the TLS endpoint proxy calculate session encryption keys (step 1322). The client device and the TLS endpoint proxy utilize the session encryption keys for secure communication between the client device and the TLS endpoint proxy to access the set of sensitive data (step 1324). Thereafter, the process terminates.

Thus, illustrative embodiments of the present invention provide a computer-implemented method, computer system, and computer program product for providing protection of data that is in transit via a network using exclusive control of cryptographic keys and certificates across a hybrid multi-cloud and edge environment comprised of a plurality of clouds corresponding to different cloud providers and a plurality of edge devices. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for certificate and key management, the computer-implemented method comprising:
  deploying, by a computer, a signed certificate corresponding to an enterprise to a plurality of cryptographic communication protocol endpoint proxies located in a heterogeneous distributed computing environment where a private key corresponding to the enterprise is not placed in any of the plurality of cryptographic communication protocol endpoint proxies;

receiving, by the computer using a hardware security module of the computer, offload of cryptographic communications from the plurality of cryptographic communication protocol endpoint proxies to the hardware security module where the hardware security module verifies connection authenticity for the plurality of cryptographic communication protocol endpoint proxies across the heterogeneous distributed computing environment using the private key corresponding to the enterprise that remains within a security boundary of the hardware security module;

receiving, by the computer using a cryptographic communication protocol endpoint proxy of the computer, a connection with the cryptographic communication protocol endpoint proxy from a user client device via a network, the user client device wanting to access a set of sensitive data corresponding to the enterprise using the connection; and generating, by the computer using the cryptographic communication protocol endpoint proxy, a base point G on an elliptic curve and a cryptographic nonce to calculate a hash of a digest of handshake messages between the user client device and the computer based on cryptographic communication protocol information provided by the user client device in a client hello message, wherein the heterogeneous distributed computing environment comprises a hybrid multi-cloud and edge environment comprised of a plurality of clouds provided by different cloud providers comprising TLS endpoint-ingress and a plurality of edge devices comprising TLS endpoint-ingress.

2. The computer-implemented method of claim 1 further comprising:

generating, by the computer using the hardware security module, a public key/private key pair corresponding to the enterprise where the private key of the enterprise remains within the security boundary of the hardware security module for an entire lifecycle of the private key;

generating, by the computer using the hardware security module, a signed certificate signing request using the private key of the enterprise; and receiving, by the computer, the signed certificate corresponding to the enterprise that is based on the signed certificate signing request from a certificate authority.

3. The computer-implemented method of claim 2 further comprising:

receiving, by the computer using the hardware security module, a request to generate the public key/private key pair corresponding to the enterprise from a client device corresponding to the enterprise via a network;

generating, by the computer using the hardware security module, the public key/private key pair corresponding to the enterprise in response to receiving the request; and storing, by the computer using the hardware security module, the private key of the enterprise within the security boundary of the hardware security module where the private key does not leave the security boundary for an entire lifecycle of the private key.

4. The computer-implemented method of claim 3 further comprising:

sending, by the computer using the hardware security module, a public key of the public key/private key pair corresponding to the enterprise to the client device corresponding to the enterprise via the network.

5. The computer-implemented method of claim 4 further comprising:

receiving, by the computer using the hardware security module, a request to sign a certificate signing request from the client device corresponding to the enterprise via the network;

signing, by the computer using the hardware security module, the certificate signing request using the private key of the enterprise stored within the security boundary of the hardware security module to form the signed certificate signing request; and sending, by the computer using the hardware security module, the signed certificate signing request to the client device corresponding to the enterprise via the network, wherein the client device sends the signed certificate signing request to a certificate authority to receive the signed certificate corresponding the enterprise.

6. The computer-implemented method of claim 1 further comprising:

receiving, by the computer using the hardware security module, a request from the cryptographic communication protocol endpoint proxy for the hardware security module to sign the hash of the digest of handshake messages;

signing, by the computer using the hardware security module, the hash of the digest of handshake messages using the private key corresponding to the enterprise that was generated and kept within the security boundary of the hardware security module to form a signed hash of the digest of handshake messages; and sending, by the computer using the hardware security module, the signed hash of the digest of handshake messages to the cryptographic communication protocol endpoint proxy.

7. The computer-implemented method of claim 6 further comprising:

sending, by the computer using the cryptographic communication protocol endpoint proxy, a server hello message that includes the signed hash of the digest of handshake messages to the user client device via the network, wherein the user client device verifies validity of a digital signature of the signed hash using a public key that corresponds to the private key of the enterprise used to sign the hash to access the set of sensitive data corresponding to the enterprise.

8. The computer-implemented method of claim 1 further comprising:

implementing, by the computer using a cryptographic communication protocol endpoint proxy of the computer, a server hello message, server certificate message, and server key exchange generation;

sending, by the computer using the cryptographic communication protocol endpoint proxy, a request from the cryptographic communication protocol endpoint proxy to the hardware security module to sign a public key that the cryptographic communication protocol endpoint proxy generated during implementation of the server key exchange generation;

signing, by the computer using the hardware security module, the public key that the cryptographic communication protocol endpoint proxy generated during the implementation of the server key exchange generation using the private key corresponding to the enterprise to form a signed public key; and sending, by the computer using the hardware security module, the signed public key that the hardware security module signed using the private key corresponding to the enterprise from the hardware security module to the cryptographic communication protocol endpoint proxy.

9. The computer-implemented method of claim 8 further comprising:

preparing, by the computer using the cryptographic communication protocol endpoint proxy, a server key exchange message that includes the signed public key signed by the hardware security module using the private key corresponding to the enterprise; and sending, by the computer using the cryptographic communication protocol endpoint proxy, the server hello message, the server certificate message, the server key exchange message, and a server hello done message to a user client device via a network, wherein, in response to the user client device verifying validity of a server certificate and signature of the signed public key, the user client device and the cryptographic communication protocol endpoint proxy calculate session encryption keys for secure communication between the user client device and the cryptographic communication protocol endpoint proxy.

10. The computer-implemented method of claim 1, wherein the plurality of cryptographic communication protocol endpoint proxies comprises a plurality of Transport Layer Security (TLS) endpoint proxies.

11. The computer-implemented method of claim 10, wherein the hardware security module is connected to the plurality of TLS endpoint proxies located across the plurality of clouds provided by the different cloud providers and the plurality of edge devices comprising the hybrid multi-cloud and edge environment.

12. A computer system for certificate and key management, the computer system comprising:

a bus system;

a hardware security module;

a storage device connected to the bus system, wherein the storage device stores program instructions; and a processor connected to the bus system, wherein the processor executes the program instructions to:

deploy a signed certificate corresponding to an enterprise to a plurality of cryptographic communication protocol endpoint proxies located in a heterogeneous distributed computing environment where a private key corresponding to the enterprise is not placed in any of the plurality of cryptographic communication protocol endpoint proxies;

receive, using the hardware security module, offload of cryptographic communications from the plurality of cryptographic communication protocol endpoint proxies to the hardware security module where the hardware security module verifies connection authenticity for the plurality of cryptographic communication protocol endpoint proxies across the heterogeneous distributed computing environment using the private key corresponding to the enterprise that remains within a security boundary of the hardware security module;

receive, using a cryptographic communication protocol endpoint proxy of the computer, a connection with the cryptographic communication protocol endpoint proxy from a user client device via a network, the user client device wanting to access a set of sensitive data corresponding to the enterprise using the connection; and generate, using the cryptographic communication protocol endpoint proxy, a base point G on an elliptic curve and a cryptographic nonce to calculate a hash of a digest of handshake messages between the user client device and the computer based on cryptographic communication protocol information provided by the user client device in a client hello message, wherein the heterogeneous distributed computing environment comprises a hybrid multi-cloud and edge environment comprised of a plurality of clouds provided by different cloud providers comprising TLS endpoint-ingress and a plurality of edge devices comprising TLS endpoint-ingress.

13. The computer system of claim 12, wherein the processor further executes the program instructions to:

generate, using the hardware security module, a public key/private key pair corresponding to the enterprise where the private key of the enterprise remains within the security boundary of the hardware security module for an entire lifecycle of the private key;

generate, using the hardware security module, a signed certificate signing request using the private key of the enterprise; and receive the signed certificate corresponding to the enterprise that is based on the signed certificate signing request from a certificate authority.

14. A computer program product for certificate and key management, the computer program product comprising a computer-readable storage medium having program instructions embodied therewith, the program instructions executable by a computer to cause the computer to perform a method of:

deploying, by the computer, a signed certificate corresponding to an enterprise to a plurality of cryptographic communication protocol endpoint proxies located in a heterogeneous distributed computing environment where a private key corresponding to the enterprise is not placed in any of the plurality of cryptographic communication protocol endpoint proxies;

receiving, by the computer using a hardware security module of the computer, offload of cryptographic communications from the plurality of cryptographic communication protocol endpoint proxies to the hardware security module where the hardware security module verifies connection authenticity for the plurality of cryptographic communication protocol endpoint proxies across the heterogeneous distributed computing environment using the private key corresponding to the enterprise that remains within a security boundary of the hardware security module;

receiving, by the computer using a cryptographic communication protocol endpoint proxy of the computer, a connection with the cryptographic communication protocol endpoint proxy from a user client device via a network, the user client device wanting to access a set of sensitive data corresponding to the enterprise using the connection; and generating, by the computer using the cryptographic communication protocol endpoint proxy, a base point G on an elliptic curve and a cryptographic nonce to calculate a hash of a digest of handshake messages between the user client device and the computer based on cryptographic communication protocol information provided by the user client device in a client hello message, wherein the heterogeneous distributed computing environment comprises a hybrid multi-cloud and edge environment comprised of a plurality of clouds provided by different cloud providers comprising TLS endpoint-ingress and a plurality of edge devices comprising TLS endpoint-ingress.

15. The computer program product of claim 14 further comprising:

generating, by the computer using the hardware security module, a public key/private key pair corresponding to the enterprise where the private key of the enterprise remains within the security boundary of the hardware security module for an entire lifecycle of the private key;

generating, by the computer using the hardware security module, a signed certificate signing request using the private key of the enterprise; and receiving, by the computer, the signed certificate corresponding to the enterprise that is based on the signed certificate signing request from a certificate authority.

16. The computer program product of claim 15 further comprising:

receiving, by the computer using the hardware security module, a request to generate the public key/private key pair corresponding to the enterprise from a client device corresponding to the enterprise via a network;

generating, by the computer using the hardware security module, the public key/private key pair corresponding to the enterprise in response to receiving the request; and storing, by the computer using the hardware security module, the private key of the enterprise within the security boundary of the hardware security module where the private key does not leave the security boundary for an entire lifecycle of the private key.

17. The computer program product of claim 16 further comprising:

sending, by the computer using the hardware security module, a public key of the public key/private key pair corresponding to the enterprise to the client device corresponding to the enterprise via the network.

18. The computer program product of claim 17 further comprising:

receiving, by the computer using the hardware security module, a request to sign a certificate signing request from the client device corresponding to the enterprise via the network;

signing, by the computer using the hardware security module, the certificate signing request using the private key of the enterprise stored within the security boundary of the hardware security module to form the signed certificate signing request; and sending, by the computer using the hardware security module, the signed certificate signing request to the client device corresponding to the enterprise via the network, wherein the client device sends the signed certificate signing request to a certificate authority to receive the signed certificate corresponding the enterprise.

19. The computer system of claim 12, wherein the plurality of cryptographic communication protocol endpoint proxies comprises a plurality of Transport Layer Security (TLS) endpoint proxies.

20. The computer system of claim 19, wherein the hardware security module is connected to the plurality of TLS endpoint proxies located across the plurality of clouds provided by the different cloud providers and the plurality of edge devices comprising the hybrid multi-cloud and edge environment.

21. The computer program product of claim 14, wherein the plurality of cryptographic communication protocol endpoint proxies comprises a plurality of Transport Layer Security (TLS) endpoint proxies.

22. The computer program product of claim 21, wherein the hardware security module is connected to the plurality of TLS endpoint proxies located across the plurality of clouds provided by the different cloud providers and the plurality of edge devices comprising the hybrid multi-cloud and edge environment.

\* \* \* \* \*